United States Patent
Li et al.

(10) Patent No.: US 8,315,643 B2
(45) Date of Patent: Nov. 20, 2012

(54) EFFICIENT CQICH TRANSPORT FORMAT

(75) Inventors: Guangjie Li, Beijing (CN); Xiaoxin Wu, Beijing (CN); Zhangyong Ma, Beijing (CN); Yang Gao, Beijing (CN); May Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1258 days.

(21) Appl. No.: 12/057,678

(22) Filed: Mar. 28, 2008

(65) Prior Publication Data

US 2009/0041138 A1 Feb. 12, 2009

Related U.S. Application Data

(60) Provisional application No. 60/955,155, filed on Aug. 10, 2007.

(51) Int. Cl.
*H04W 72/00* (2009.01)

(52) U.S. Cl. ............... 455/452.2; 455/447; 455/450; 455/453; 455/522; 370/329; 370/343; 370/351; 370/252; 375/260; 375/267

(58) Field of Classification Search ............... 375/260, 375/267; 370/329, 343, 351, 252; 455/452.2, 455/450, 522, 453, 447
See application file for complete search history.

(56) References Cited

U.S. PATENT DOCUMENTS

| | | | | |
|---|---|---|---|---|
| 7,907,677 B2 * | 3/2011 | Li et al. | ............ | 375/267 |
| 7,933,238 B2 * | 4/2011 | Sartori et al. | .......... | 370/328 |
| 2004/0013096 A1 * | 1/2004 | Marinier et al. | ......... | 370/328 |
| 2006/0221883 A1 * | 10/2006 | Damnjanovic et al. | ....... | 370/315 |
| 2007/0183380 A1 * | 8/2007 | Rensburg et al. | ......... | 370/338 |
| 2007/0189235 A1 * | 8/2007 | Chandra et al. | ........... | 370/335 |
| 2007/0258373 A1 * | 11/2007 | Frederiksen et al. | ...... | 370/235 |
| 2007/0263746 A1 * | 11/2007 | Son | ........................ | 375/267 |
| 2008/0013610 A1 * | 1/2008 | Varadarajan et al. | ...... | 375/221 |
| 2008/0188259 A1 * | 8/2008 | Blanz et al. | ............. | 455/522 |
| 2008/0219219 A1 * | 9/2008 | Sartori et al. | .......... | 370/335 |
| 2008/0219370 A1 * | 9/2008 | Onggosanusi et al. | ..... | 375/260 |
| 2008/0298482 A1 * | 12/2008 | Rensburg et al. | ......... | 375/260 |
| 2009/0003274 A1 * | 1/2009 | Kwak et al. | ............ | 370/329 |
| 2009/0154588 A1 * | 6/2009 | Chen et al. | ............. | 375/267 |
| 2009/0325585 A1 * | 12/2009 | Farajidana et al. | ........ | 455/450 |
| 2010/0040001 A1 * | 2/2010 | Montojo et al. | .......... | 370/329 |

OTHER PUBLICATIONS

F. Wang, A. Ghosh, R. Love, K. Stewart et.al., "IEEE 802.16e System Performance-Analysis and Simulation Results", Proc. of PIMRC, Berlin, Germany, Sep. 2005.
3rd Generation Partnership Project; Technical Specification Group Radio Access Network; Physical layer aspects for evolved Universal Terrestrial Radio Access (UTRA)(Release 7), Sep. 2006.

* cited by examiner

*Primary Examiner* — Rafael Pérez-Gutiérrez
*Assistant Examiner* — Lameka J. Kirk
(74) *Attorney, Agent, or Firm* — Carrie A. Boone, P.C.

(57) ABSTRACT

An efficient channel quality indicator channel (CQICH) transport method and system are disclosed. The CQICH transport method defines five types of CQI transport formats, to cover known cases of CQI feedback. The CQICH transport method further defines the format of transportation, which enables any of the five types of CQI transport formats to be transmitted.

11 Claims, 4 Drawing Sheets

EFFICIENT CQICH TRANSPORT FORMAT

CROSS-REFERENCE TO RELATED APPLICATIONS

This application claims priority under 35 U.S.C. 119(e) to U.S. Provisional Patent Application No. 60/955,155, entitled, "ADVANCED WIRELESS COMMUNICATION SYSTEMS AND TECHNIQUES", filed on Aug. 10, 2007.

TECHNICAL FIELD

This application relates to channel quality indicator (CQI) transmissions by subscriber stations to a base station in a wireless neighborhood and, more particularly, to efficient processing of various types of CQI transmissions by the base station.

BACKGROUND

The Institute of Electrical and Electronics Engineers (IEEE) has adopted a set of standards for wireless local area networks (WLANs), known as 802.11, as well a set of standards for wireless metropolitan area networks (WMANs), known as 802.16. Wireless products satisfying the 802.11 and 802.16 standards are currently on the market, for example. The term, WiFi, is used herein to describe equipment satisfying the 802.11 standard. The term, WiMAX, short for worldwide interoperability for microwave access, is used herein to describe equipment satisfying the 802.16 standard.

In WiMAX orthogonal frequency division multiple access (OFDMA) downlink (DL) scheduling, the base station (BS) scheduler obtains channel feedback from a subscriber station (SS) to efficiently exploit multi-user diversity and enhance spectral efficiency. Specifically, the base station regularly receives channel quality indicator (CQI) information from the subscriber station. Thus, in a wireless neighborhood, the base station receives CQI information from the subscriber station, with which the base station updates a scheduling algorithm. The scheduling algorithm pertains to all subscribers in the wireless neighborhood, and determines transmission order, data rate, modulation type, and other characteristics of transmissions by the base station. Since the base station regularly receives CQI information from the various mobile stations in the wireless neighborhood, the scheduling algorithm is likewise regularly updated.

Among scheduling algorithms, frequency selective scheduling (FSS) can provide much more throughput compared with diversity scheduling. Frequency selective scheduling utilizes the multi-user diversity in each resource block (RB) and selects the best quality user in the resource block. The base station generates the resource block, for transmitting data to one or more subscriber stations. The base station may include one or more spatial streams.

While the frequency selective scheduling algorithm may be preferred over a diversity scheduling algorithm, the FSS algorithm requires the individual channel quality indicator (CQI) feedback from the subscriber stations in the wireless neighborhood. The CQI feedback may be individual CQI or continuous CQI. Thus, each subscriber station should feed the CQI of each resource block back to the base station, in order for the base station to successfully implement the FSS algorithm.

It turns out that it may be very challenging for each subscriber station in the wireless neighborhood to feed back the CQIs of each resource block, particularly where there are lots of resource blocks and lots of subscriber stations (users). With more resource blocks (given by M) and more subscriber stations (given by N), the base station is burdened with much more feedback overhead.

For example, if there are fifty subscriber stations and twenty-four resource blocks, assuming each CQI uses five bits, the total CQI overhead is expected to be 50×24×5=6000 bits. With this much overhead, full CQI feedback is not practical.

Some CQI compression algorithms have been proposed to reduce the overhead. For example, a best-M algorithm, an average best-M algorithm, and a bitmap algorithm have been proposed. The best-M algorithm and its variants, threshold-based CQI compression algorithms, require the subscriber station to feed the CQI of the best M resource blocks back to the base station.

Prior art designs have relied on different CQI formats. Thus, there is no agreed upon CQI format for transmission between the subscriber stations and the base station. Further, where compression algorithms are used, there is no standard representation of the compressed CQI before it is transported from the subscriber stations to the base station.

Thus, there is a continuing need for a full CQI feedback implementation that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, an efficient channel quality indicator channel (CQICH) transport method is disclosed. The CQICH transport method defines five types of CQI transport formats, to cover known cases of CQI feedback. The CQICH transport method further defines the format of transportation, which enables any of the five types of CQI transport formats to be transmitted.

Figure 1:
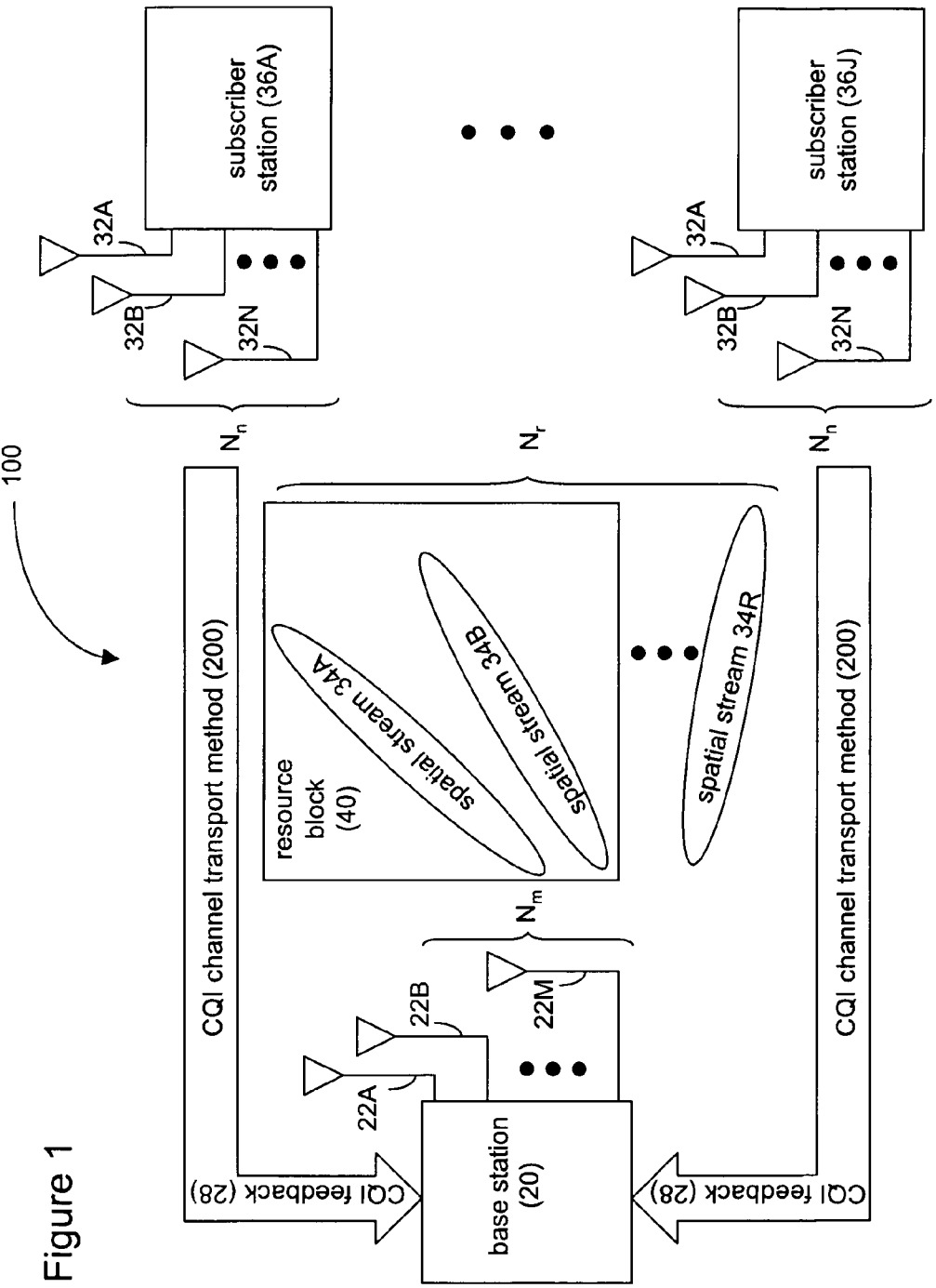
FIG. 1 is a block diagram of a wireless neighborhood including CQI feedback from subscriber station(s) to the base station, according to some embodiments.

FIG. 1 is a block diagram of a wireless neighborhood 100, according to some embodiments. The wireless neighborhood 100 consists of a base station 20 and J subscriber stations 36A, 36B, . . . , 36J (collectively, subscriber stations 36), each of which has multiple antennas 22, 32. The base station 20 has m antennas 22A, 22B, ..., 22M (collectively, transmit antennas 22). The subscriber stations 36 each have n antennas 32A, 32B, ..., 32N (collectively, receive antennas 32). In the wireless neighborhood 100, the transmit antenna number, $N_m$, is larger than the receiver antenna number, $N_n$, for each subscriber station 36. Stated mathematically, $N_m > N_n$. The base station 20 generates a resource block (RB) 40, which may consist of multiple spatial streams 34A, 34B, ..., 34R (collectively, spatial streams 34). The wireless neighborhood 100 is a multiple-input-multiple-output, or MIMO, system, in which both the base station 20 and the subscriber stations 36 have multiple antennas.

Each subscriber station 36 transmits CQI feedback 28 to the base station 20, using a CQI channel transport method 200, according to some embodiments. The wireless neighborhood 100 may therefore be known herein as a CQI channel transport system 100. In the CQI channel transport system 100, the base station 20 may transmit multiple fixed or semi-static spatial streams 34 in each resource block. In FIG. 1, resource block 40 includes two spatial streams, 34A and 34B. The base station 20 may allocate more resource blocks (not shown) in the CQI channel transport system 100, with each resource block having different spatial streams 34. The spatial streams 34 may be scheduled to multiple subscriber stations (users) or to a single subscriber station, according to the CQI feedback 28 received from each subscriber station 36. The terms subscriber station and user refer to the same entity 36 shown in FIG. 1, and these terms are used interchangeably throughout the detailed description.

Figure 2:
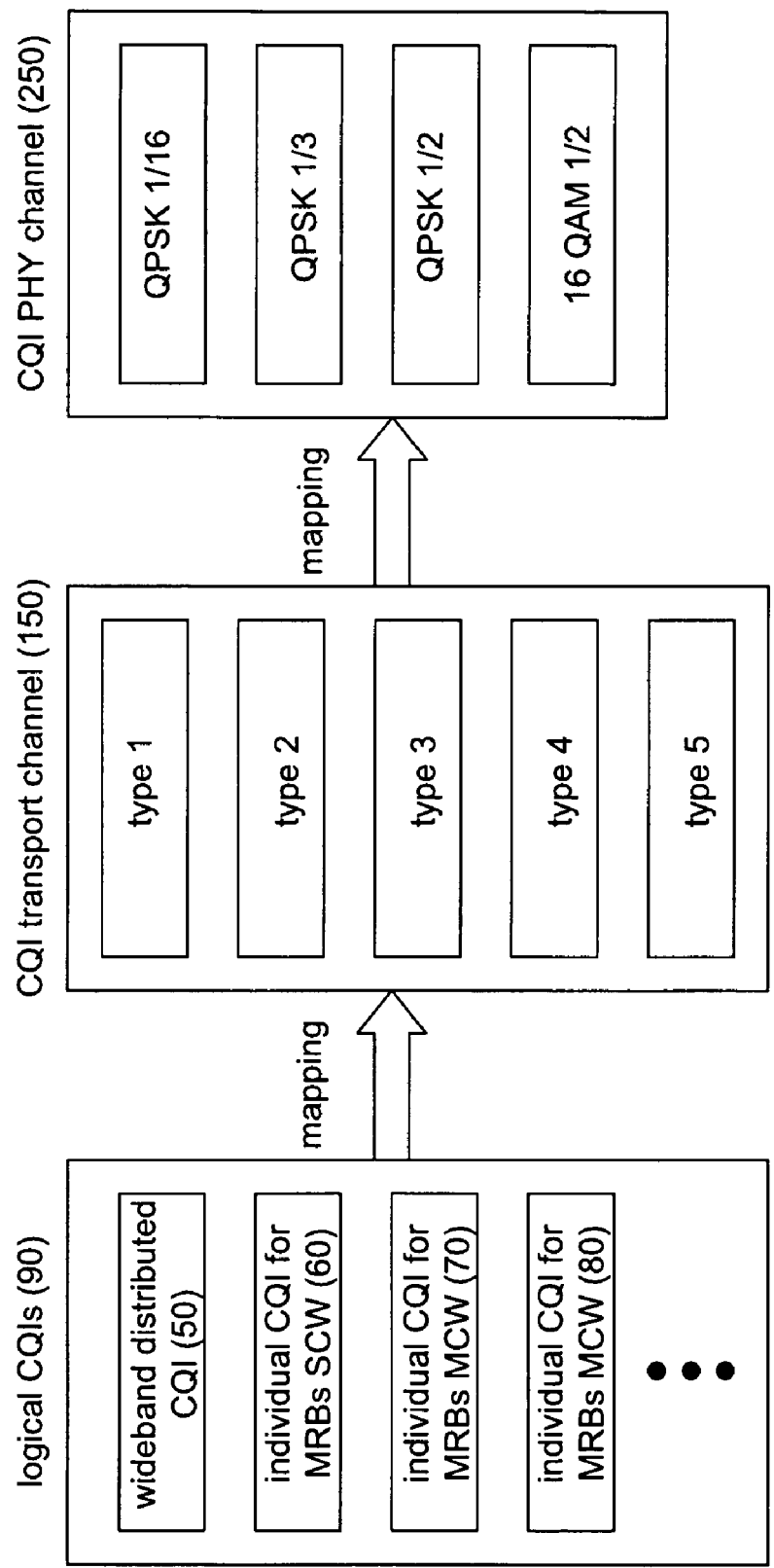
FIG. 2 is a block diagram illustrating the mapping between logical CQIs, the CQI transport channel, and the CQI PHY channel, according to some embodiments.

According to the CQI channel transport method 200, before the subscriber station 36 transfers the CQI feedback 28 to the base station 20, two mapping operations are performed, as illustrated in FIG. 2, according to some embodiments. The CQI feedback 28, in logical form (logical CQI 90), is mapped to one or more CQI transport channels 150. The CQI transport channels 150 are then mapped to one or more CQI physical layer (PHY) channels 250.

In FIG. 2, the logical CQIs 90 include wideband distributed CQI 50, individual CQI for multiple resource blocks single codeword (SCW) 60, individual CQI for multiple resource blocks multiple codeword (MCW) 70, and individual CQI for multiple resource blocks MCW 80. With SCW MIMO, all the spatial streams use the same coding and modulation; with MCW MIMO, the coding and modulation for each spatial stream is independent of others. In other words, with MCW MIMO, each spatial stream may use a different coding and modulation scheme. The CQI transport channel 150 includes CQI modes type 1, type 2, type 3, type 4, and type 5. The CQI PHY channel 250 includes quadrature phase-shift keying (QPSK) 1/16, QPSK 1/3, QPSK 1/2, and 16 quadrature amplitude modulation (QAM) 1/2.

Where one transport CQI channel 150 is insufficient to hold the logical CQIs 90, two CQI modes (e.g., type 1 and type 2) or more (e.g., types 1, 2, and 3) CQI transport channels 150 are used, in some embodiments. Further, one subscriber station 36 may use one or more kinds of CQI modes simultaneously, in some embodiments.

The five modes of CQI supported by the CQI channel transport method 200 are described in the following paragraphs. In describing these CQI modes, the terms $N_b$, $N_s$, and $N_{rb}$ are used, with $N_b$ being the number of bands in the resource block, $N_s$ being the number of spatial streams, and $N_{rb}$ being the total number of resource blocks 40 used by the base station 20. In the CQI channel transport system 100 (FIG. 1), the following equation provides the total number of resource blocks: $N_{rb} = N_s * N_b$.

Type 1: Wideband CQI

Figure 3:
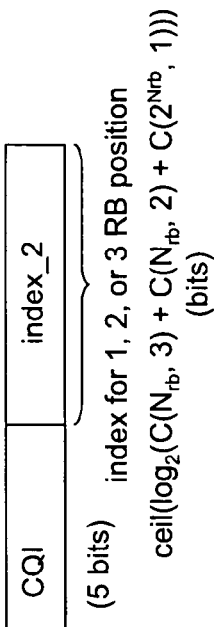
FIG. 3 is a block diagram of a first CQI format type, according to some embodiments.

FIG. 3 is a simplified block diagram depicting the bitmap for wideband CQI, also known herein as type 1 CQI. The absolute CQI, that is, the actual CQI value, such as the signal-to-interference-plus-noise ratio (SINR, in dB), is stored in five bits. Type 1 CQI may hold several types of CQI:

CQI for distributed resource block organization in SCW MIMO

CQI for all the bands in adaptive modulation and coding (AMC) mode. The one CQI value covers all the resource blocks, including the CQI of all the layers of the spatial streams (if any) at each band.

Single-stream CQI: CQI for the first stream of all the bands in AMC mode. This is the valid CQI value for all the resource blocks, including the CQI of all the layers of the spatial stream (if any) at each band.

Type 2: One Average CQI of One Position of RB

Figure 4:
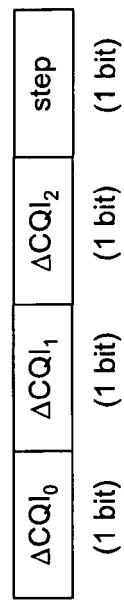
FIG. 4 is a block diagram of a second CQI format type, according to some embodiments.

FIG. 4 is a simplified block diagram depicting the bitmap for one average CQI of one position of the resource block, also known herein as type 2 CQI. The format is five bits for the CQI, plus $\log_2(2^{Nrb})$ bits for the index of the resource block, index_0. The resource block index, index_0, indicates the position of the resource block that can use the corresponding CQI. The number of bits for the resource block index, index_0, is $B_0$ bits, where $B_0 = \text{ceil}(\log_2(2^{Nrb}))$.

For example, where the number of resource blocks, $N_{rb}$, is twenty-four, such as where the number of bands, $N_b$, is twelve and number of spatial streams, $N_s$, is two ($N_{rb} = 24$, $N_b = 12$, $N_s = 2$), the resource block index, index_0, is six bits. Thus, the type 2 bitmap has eleven bits.

The $\log_2(2^{Nrb})$ bits can represent $N_{rb}$ resource blocks 40 plus $N_{rb}$ group resource blocks. A group resource block includes several continuous resource blocks 40.

Figure 8:
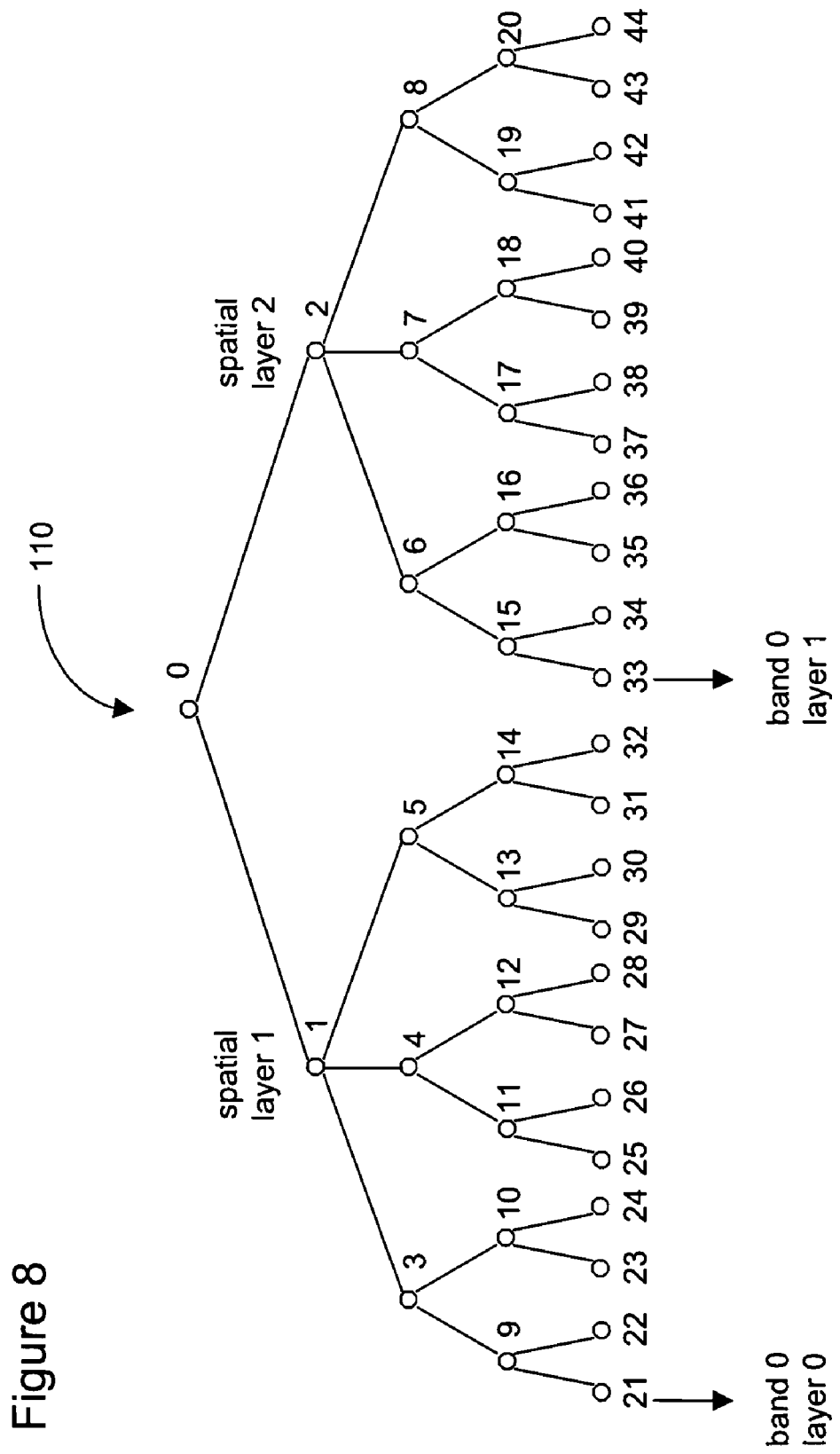
FIG. 8 is a diagram illustrating resource block indexing for multiple spatial streams of MIMO, according to some embodiments.

In MCW MIMO mode, the number of spatial streams, $N_s$, is greater than one ($N_s > 1$). In this case, the tree-based indexing is extended to a structure 110, as depicted in FIG. 8, according to some embodiments. The indexing follows a "breadth first" tree search rule. FIG. 8 shows an example where there are twelve bands and two spatial streams ($N_b = 12$, $N_s = 2$) in the tree structure 110. The tree 110 is first divided into two sub-trees, each sub-tree corresponding to a spatial stream. In the tree 110, the resource block index, index_0, is six bits.

The type 2 CQI (FIG. 4) can hold several types of CQI:

One resource block CQI for SCW in continuous mode

One resource block CQI for MCW in continuous mode

Wideband CQI in distributed mode

Because it introduces "tree indexing" or "group indexing", the type 2 CQI may represent all the information of the type 1 CQI. For example, type 2 CQI may be used to transfer the wideband CQI. However, the payload for wideband CQI is twice as much when using type 2 CQI as when using type 1 CQI.

Type 3: One Average CQI of 1 or 2 Positions of RB

Figure 5:
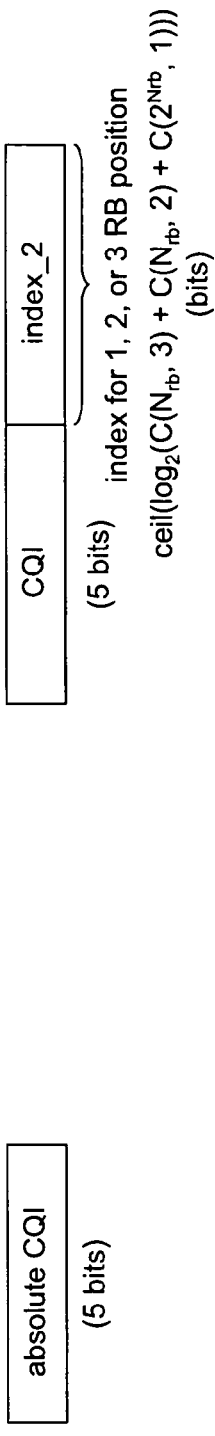
FIG. 5 is a block diagram of a third CQI format type, according to some embodiments.

FIG. 5 is a simplified block diagram depicting the bitmap for one average CQI of one or two positions of the resource block, also known herein as type 3 CQI. Type 3 CQI may be used to report the CQI of one group resource block, or two individual resource block positions. The format is five bits for the CQI, plus $\log_2(C(N_{rb}, 2) + C(2^{Nrb}, 1))$ bits for the index of the resource block, index_1. The resource block index, index_1, indicates the position of the resource block that can use the corresponding CQI. The number of bits for the resource block index, index_1, is $B_1$ bits, where $$B_1 = \text{Ceil}\left(\log_2\left(\binom{Nrb}{2} + 2Nrb\right)\right).$$

The position refers to the location of the resource block in the entire resource. In other words, the position corresponds to the index of the resource block. For the type 3 CQI mode, the position is $P_0$ and $P_1$, ($P_1 > P_0$, and $P_1$, $P_0 = 0$: Nrb−1).

In some embodiments, the CQI channel transport method 200 uses a direct form of equation to calculate the index, index_1, from the two positions of $P_0$ and $P_1$:

$$\text{Index\_1} = \begin{cases} \dfrac{-P_0^2 + (2Nrb - 3) \cdot P_0 + 2P_1 - 2}{2}, & (1) \\ \dfrac{1}{2} \cdot Nrb \cdot (Nrb - 1) + \text{Index\_0}; & (2) \\ \dfrac{1}{2} \cdot Nrb \cdot (Nrb - 1) + 2NrB \to 2^B - 1; & N/A \end{cases} \quad (1)$$

where $P_1 > P_0$, $P_1$, $P_0 = 0$: Nrb−1 and index_0 is the index from the tree structure for one position or for a group position. In branch (1), only one resource block's CQI is reported, in some embodiments. In branch (2), two resource blocks' CQI are reported. The index_1 within the range $$\left(\binom{Nrb}{1} + 2NrB, , 2^{B\_1} - 1\right)$$

is reserved.

Again, using the example from above, where the number of bands is twelve and the number of spatial streams is two, ($N_b = 12$, $N_s = 2$), the index_1 field, $B_1$, is nine bits ($B_1 = 9$). In some embodiments, direct representation for a 12-band, two-spatial stream configuration is achieved using five bits to represent the position (index) of one resource block and six bits to represent the group resource block. In some embodiments, the group resource block uses the tree-based resource block indexing method, which would use six bits to cover all 48 nodes in the tree. Thus, where there is direct representation of these positions, the CQI is transmitted using 6+5=11 bits ($N_{rb} = 24$, plus group resource block, total 48). As this example demonstrates, the CQI channel transport method 200 can save two bits without any change in complexity.

When reporting the average CQI of resource block 0 and resource block 1, ($P_0 = 0$, $P_1 = 1$), the resource block index, index_1=0. When reporting the average CQI of resource block 3 and resource block 11 ($P_0 = 3$, $P_1 = 11$), the resource block index, index_1=37. When reporting the average CQI of the group resource block 9, meaning the CQI for band 0, layer 0 and band 1, layer 0, the resource block index, index_1=285, using equation (1), above.

When the base station 20 receives the resource block index, index_1, field, the values, $P_0$ and $P_1$, can be deduced accordingly.

The type 3 CQI contains the representation range of both type 1 CQI and type 2 CQI. In other words, the type 3 CQI can cover the type 1 CQI and the type 2 CQI. The type 3 CQI fields shown in FIG. 5 can hold information that may be transferred to either the type 1 CQI or type 2 CQI transport format.

Type 4: One Average CQI of 3 Positions of RB

Figure 6:
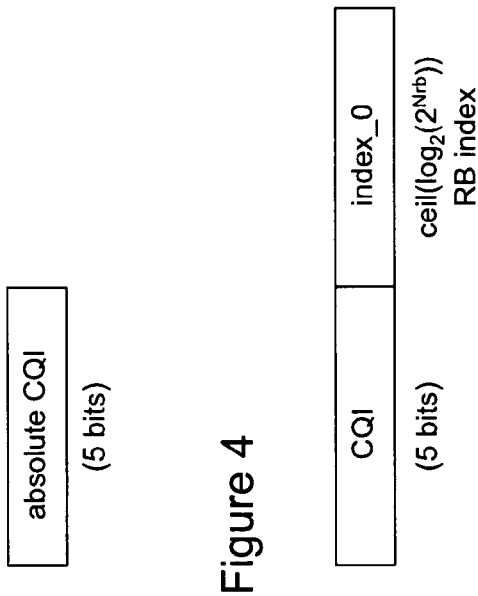
FIG. 6 is a block diagram of a fourth CQI format type, according to some embodiments.

FIG. 6 is a simplified block diagram depicting the bitmap for one average CQI of three positions of the resource block, also known herein as type 4 CQI. Type 4 CQI may be used to report one average CQI for three resource blocks, two resource blocks, or one resource block. The format is five bits for the CQI, plus $\log_2(C(N_{rb}, 3) + C(N_{rb}, 2) + C(2^{Nrb}, 1)))$ bits for the index of the resource block, index_2. The resource block index, index_2, indicates the position of the resource block that can use the corresponding CQI.

The number of bits for the resource block index, index_2, is $B_2$ bits, where $$B_2 = \text{Ceil}\left(\log_2\left(\binom{Nrb}{2} + \binom{Nrb}{3} + 2Nrb\right)\right).$$

Again, using the example from above, where the number of bands is twelve and the number of spatial streams is two, ($N_b = 12$, $N_s = 2$), the index_2 field, $B_2$, is twelve bits ($B_2 = 12$).

In some embodiments, the CQI channel transport method 200 uses a direct form of equation to calculate the index, index_2, from the three positions of $P_0$, $P_1$, and $P_2$:

$$\text{Index\_2} = \begin{cases} \dfrac{1}{6}P_0^3 + \dfrac{1}{2}(2 - N) \cdot P_0^2 + \left(\dfrac{1}{2}Nrb^2 - 2Nrb + \dfrac{11}{6}\right) \\ \quad P_0 + \dfrac{-2Nrb + (2Nrb - 3)P_1 - P_1^2 + 2P_2}{2} \end{cases} ; \;(3\ RBs) \\ \begin{cases} \dfrac{1}{6} \cdot Nrb \cdot (Nrb - 1) \cdot (Nrb - 2) + \\ \dfrac{-P_0^2 + (2Nrb - 3) \cdot P_0 + 2P_1 - 2}{2} \end{cases} ; \;(2\ RBs) \\ \begin{cases} \dfrac{1}{6} \cdot Nrb \cdot (Nrb - 1) \cdot (Nrb - 2) + \dfrac{1}{2} \cdot \\ Nrb \cdot (Nrb - 1) + \text{Index\_0} \end{cases} ; \;(1\ RBs) \\ \text{Others}, \qquad N/A$$

where $P_0$, $P_1$, and $P_2$ are the three positions of the resource blocks 40, and $P_2 > P_1 > P_0$, $\{P_0, P_1, P_2\} = 0: N_{rb} - 1$.

Type 5: Time Domain Differential CQI

Figure 7:
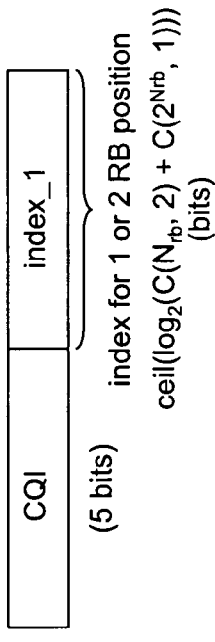
FIG. 7 is a block diagram of a fifth CQI format type, according to some embodiments.

FIG. 7 is a simplified block diagram depicting the bitmap for time domain differential CQI, also known herein as type 5 CQI. The format of type 5 CQI is four bits, including three bits of differential CQI value for the average CQI transmitted before ($\Delta CQI_0$, $\Delta CQI_1$, $\Delta CQI_2$), and one bit of step information.

Type 5 CQI covers almost all CQI feedback schemes, in some embodiments. Further, type 5 CQI has low overhead and low computation complexity, using a direct form of equation.

Returning to FIG. 1, the CQI channel transport method 200 enables type 1 CQI, type 2 CQI, type 3 CQI, type 4 CQI, or type 5 CQI, as described above, to be transmitted from the subscriber stations 36 to the base station 20 in the CQI channel transport system 100. CQI feedback is an essential part for enabling link adaptation and frequency selective scheduling. Having an efficient CQI format may further benefit advanced adaptation algorithms, like code division multiplexing (CDM), multiple-user MIMO, and so on.

While the application has been described with respect to a limited number of embodiments, those skilled in the art will appreciate numerous modifications and variations therefrom. It is intended that the appended claims cover all such modifications and variations as fall within the true spirit and scope of the above description.

We claim:
1. A system, comprising:
a subscriber station comprising a plurality of subscriber station antennas, the number of subscriber station antennas being less than or equal to a number of antennas located on a base station, wherein the subscriber station stores a logical channel quality indicator (CQI) in a predefined format before transmitting the CQI to the base station;
the predefined format comprising five bits and $B_0$ additional bits, wherein the CQI is stored in the five bits, and a resource block index is stored in the $B_0$ additional bits, and $B_0 = \text{ceil}(\log_2(2^{Nrb}))$, with $N_{rb}$ being a number of resource blocks.

2. The system of claim 1, wherein the subscriber station further:
maps the CQI stored in the predefined format into a channel quality indicator physical layer channel type.

3. The system of claim 2, wherein the CQI physical layer channel type is selected from a group consisting of quadrature phase-shift keying 1/16, quadrature phase-shift keying 1/3, quadrature phase-shift keying 1/2, and 16 quadrature amplitude modulation 1/2.

4. The system of claim 1, wherein the predefined format is for one average CQI of one position of a resource block.

5. The system of claim 1, wherein the resource block index indicates a position of the resource block that uses the corresponding CQI.

6. The system of claim 1, wherein the $B_0$ additional bits represent $N_{rb}$ resource blocks plus $N_{rb}$ group resource blocks, wherein a group resource block comprises two or more continuous resource blocks.

7. The system of claim 1, wherein the format holds one resource block CQI for single code words in continuous mode.

8. The system of claim 1, wherein the format holds one resource block CQI for multiple code words in continuous mode.

9. The system of claim 1, wherein the format holds wideband CQI in distributed mode.

10. A method, comprising:
mapping channel quality indicator (CQI) feedback into a predefined format over a CQI transport channel by a subscriber station, the predefined format comprising:
five bits for storing the CQI value; and
$B_0$ additional bits, for storing a resource block index, wherein $B_0 = \text{ceil}(\log_2(2^{Nrb}))$, with $N_{rb}$ being a number of resource blocks, wherein the resource block index indicates a resource block position that is capable of using the CQI;
mapping the CQI transport channel type into a CQI physical channel type; and
transmitting the CQI channel type to a base station.

11. The method of claim 10, further comprising:
using the predefined format to store one of the following types of CQI:
one resource block CQI for single codeword in continuous mode;
one resource block CQI for multiple codewords in continuous mode; or
wideband CQI in distributed mode.

* * * * *